United States Patent
Huang

(10) Patent No.: US 7,941,121 B2
(45) Date of Patent: May 10, 2011

(54) METHOD FOR VERIFYING THE VALIDITY OF A USER

(75) Inventor: Yingxin Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 622 days.

(21) Appl. No.: 11/413,732

(22) Filed: Apr. 28, 2006

(65) Prior Publication Data

US 2006/0253424 A1    Nov. 9, 2006

Related U.S. Application Data

(63) Continuation of application No. PCT/CN2004/001209, filed on Oct. 25, 2004.

(30) Foreign Application Priority Data

Nov. 7, 2003    (CN) .......................... 2003 1 0113230

(51) Int. Cl.
    *H04M 3/16*    (2006.01)
(52) U.S. Cl. ........ 455/411; 455/410; 380/247; 380/248; 380/249; 380/277; 380/278; 709/227; 709/228; 709/229; 713/155; 713/168; 713/169; 713/170; 713/171; 713/178
(58) Field of Classification Search .......... 455/411, 455/410, 419, 418; 380/247, 248, 249, 255, 380/260, 270, 277, 278, 279; 713/247, 248, 713/249, 255, 260, 270, 277, 278, 279; 709/227, 709/228, 229; 726/2, 3, 4, 14
See application file for complete search history.

(56) References Cited

U.S. PATENT DOCUMENTS 7,107,248 B1 * 9/2006 Asokan et al. .................. 705/67
(Continued)

FOREIGN PATENT DOCUMENTS

CN    1404267 A    3/2003
(Continued)

OTHER PUBLICATIONS

3 GPP TS ab.cde, vol. 3.0 (Sep. 2003), *3rd Generation Partnership Project; Technical Specification Group Services and System Aspects; Bootstrpping of application security using AKA and Support for Subscriber Certificats; System Description*, Release 6, pp. 1-28, XP-002320570.
(Continued)

*Primary Examiner* — Olumide T Ajibade Akonai
(74) *Attorney, Agent, or Firm* — Slater & Matsil, L.L.P.

(57) ABSTRACT

The invention disclose a method for verifying the validity of a user, making full use of a TID as the bridge for establishing confidence between a NAF and a user equipment, and the BSF assigning a term of validity for the TID, thereby extending the function of the TID, enabling the NAF to verify the term of validity for using the TID, and accordingly, achieving a further verification of the validity to the user. By using the method of the invention, it is possible to avoid the situation in which one TID is permanently valid for one or more NAFs, enhance the system security, decrease the risks caused by the theft of users' TID and corresponding secret keys, and at the same time, implement TID management by the NAF. In addition, a combination of the method with billing system makes it easy to implement the function of charging a user.

27 Claims, 4 Drawing Sheets

U.S. PATENT DOCUMENTS

| | | | |
|---|---|---|---|
| 7,197,301 B2* | 3/2007 | Netanel | 455/419 |
| 2002/0023208 A1 | 2/2002 | Jancula | |
| 2002/0147913 A1 | 10/2002 | Yip | |
| 2003/0051140 A1 | 3/2003 | Buddhikot et al. | |
| 2004/0015692 A1* | 1/2004 | Green et al. | 713/169 |
| 2004/0093419 A1* | 5/2004 | Weihl et al. | 709/229 |
| 2006/0079205 A1* | 4/2006 | Semple et al. | 455/411 |
| 2006/0253424 A1 | 11/2006 | Huang | |

FOREIGN PATENT DOCUMENTS

| | | |
|---|---|---|
| CN | 1404267 A | 3/2003 |
| CN | 1411199 A | 4/2003 |
| CN | 1411199 A | 4/2003 |
| CN | 1614923 A | 5/2005 |
| CN | 1617494 A | 5/2005 |
| CN | 1315268 C | 5/2007 |
| WO | WO 02/13016 A1 | 2/2002 |
| WO | WO 03/088578 A1 | 10/2003 |

OTHER PUBLICATIONS

Menezes, A., et al., Handbook of Applied Cryptography,. 1997, pp. 397-402, 553, 547-550, and 577-582, XP-002459958.

European Search Report dated Dec. 10, 2007, for EP 04789868.9, corresponding to priority PCT/CN2004/001209, in the name of Huawei Technologies Co., Ltd.

International Search Report dated Feb. 17, 2005, corresponding to PCT/CN2004/001209.

"3$^{rd}$ Generation Partnership Project; Technical Specification Group Services and System Aspects; Generic Authentication Architecture (GAA): Generic Bootstrapping Architecture (Release 6)," Technical Specification, 3GPP TS 33.220 V0.1.1, Nov. 18-21, 2003, Munich, Germany.

"3$^{rd}$ Generation Partnership Project; Technical Specification Group Services and System Aspects; Generic Authentication Architecture (GAA): Generic Bootstrapping Architecture (Release 6)," Technical Specification, 3GPP TS 33.220 V0.1.1, Nov. 2003, Munich, Germany.

International Search Report, International Application No. PCT/CN2004/001209, Feb. 17, 2005, 3 pages.

Canadian Office Action, Application No. 2.545.229, Dec. 30, 2009, 2 pages.

Decision of Refusal, Application No. 2006-538634, Feb. 26, 2010, 2 pages.

Japanese Office action dated Dec. 5, 2008, for corresponding Japanese application 2006-538634, noting listed references in this IDS.

3GPP TSG ab.cde vol. 1.0, *3rd Generation Partnership Project; Technical Specification Group Services and System Aspects; Generic Authentication Architechture (GAA); Generic Bootstrapping Architecture (Release 6)*; (Oct. 2003); http://www.3gpp.org/ftp/TSG_SA/WG3_Security/TSGS3_30_Povoa/Docs/ZIP/S3-030644.zip.

Calhoun, P., et al., *Diameter Base Protocol, Request for Comments*, (Sep. 2003), http://www.ietf.org/rfc/rfc3588.txt.

* cited by examiner

METHOD FOR VERIFYING THE VALIDITY OF A USER

CROSS-REFERENCE TO RELATED APPLICATIONS

This application is a Continuation Application of International Application Number PCT/CN2004/001209, filed on Oct. 25, 2004, which claims priority of Chinese Patent Application Number 200310113230.0, filed on Nov. 7, 2003.

FIELD OF THE INVENTION

The present invention relates to the third generation (3G) wireless communication technology, and more specifically to a method for verifying the validity of a user.

BACKGROUND OF THE INVENTION

In the 3G wireless communication standards, the generic authentication architecture describes a generic architecture adopted by a number of Network Application Functions (NAFs) for verifying the validity of users. By means of generic authentication architecture, it is possible to implement the authentication and verification of a user requesting a service. The above various application functions may include multicast/broadcast service, subscribers certificates service, and instant message supply service, as well as proxy service, e.g. multiple services functions entities may be connected with a proxy entity. The generic authentication architecture handles the proxy as a kind of service where the construction may be very flexible. Moreover, the generic authentication architecture may be adopted for the authentication and verification of users requesting newly developed services.

FIG. 1 is a schematic structure diagram of the generic authentication architecture. Typically, the generic authentication architecture includes a User Equipment (UE) 101, a Bootstrapping Server Function (BSF) 102, a Home Subscriber System (HSS) 103 and an NAF 104. The BSF 102 is used for mutual authentication with the UE 101, and simultaneously generating a secret key shared with the UE 101. A Profile document used for describing the subscriber information is stored in the HSS 103 which will generate authentication information.

When a UE requests a service, if the UE knows that the service requires a mutual authentication procedure in the BSF, the UE will perform a mutual authentication in the BSF directly; otherwise, the UE will first contact the NAF corresponding to the service. If the NAF applying the generic authentication architecture requires the UE to perform a bootstrapping authentication in the BSF, the NAF will instruct the UE to perform a bootstrapping authentication by means of the generic authentication architecture; otherwise, the NAF executes other appropriate processing.

FIG. 2 is a flowchart for authentication by the generic authentication architecture in the prior art.

Step 201: A UE sends to an NAF an application request message.

Step 202: Upon receiving the message, the NAF finds that the UE has not performed a mutual authentication in a BSF, and then instructs the UE to perform a bootstrapping authentication in the BSF.

Step 203: The UE sends to the BSF a bootstrapping request message.

Step 204: Upon receiving the bootstrapping request message from the UE, the BSF conducts inquiry of the necessary authentication information of the UE and the profile document thereof to the HSS, and receives a response from the HSS.

Step 205: Upon receiving the response message from the HSS containing the information inquired, the BSF performs an Authentication and Key Agreement (AKA) protocol based mutual authentication with the UE using the information inquired. When completing the AKA protocol based mutual authentication with the UE, i.e. passing the mutual authentication, the BSF generates a secret key shared with the UE (Ks).

Step 206: The BSF assigns the UE a Transaction Identifier (TID) including only the identity and valid for one or more than one NAFs. The TID is associated with the Ks.

Step 207: Upon receiving the TID assigned by the BSF, the UE resends to the NAF an application request message which contains the information of the TID.

Step 208: Upon receiving the application request message containing the information of the TID sent from the UE, the NAF will first conduct local inquiry, if the NAF finds the information of the TID locally, proceed directly to Step 210; otherwise, send to the BSF a TID inquiring message containing local identity of the NAF, and then proceed to Step 209.

Step 209: Upon receiving the TID inquiring message from the NAF, the BSF will, if finding the TID inquired by the NAF, send to the NAF a response message of success. The NAF stores the contents of the response message and proceeds to Step 210; otherwise, the BSF will send to the NAF a response message of failure, notifying the NAF that there is no information of the UE. The NAF will instruct the UE to perform a bootstrapping authentication in the BSF, and end the procedure.

The response message of success includes the TID found, the Ks corresponding to the TID or a derived secret key generated from the Ks according to the security level of the NAF. As long as receiving a response message of success from the BSF, the NAF will believe that the UE is a legitimate UE passing authentication by the BSF and share the Ks or the derived secret key with the UE.

Step 210: The NAF makes normal communications with the UE, i.e. data transmission, and protects further communications using the Ks or the derived secret key.

After the first communication process between the UE and the NAF is over, the authenticated TID is used for further communications between the UE and the NAF. Since the TID may be used repeatedly and any NAF may inquire the corresponding TID from the BSF if it can not find the TID locally, as long as obtaining a legitimate TID, the UE may make communications with the NAF using the TID for an indefinite period.

SUMMARY OF THE INVENTION

The present invention provides a method for verifying the validity of a user by means of checking whether a TID of a user is valid.

The solution in accordance with the present invention is implemented as follows:

According to an aspect of the present invention, when an NAF receives an application request message containing TID information, it determines whether the TID information exists locally, if exists, determines whether the TID expires. If the TID expires, the NAF will make normal communications with the UE; otherwise, the NAF will instruct the UE to perform a bootstrapping authentication in a BSF again;

If there is no TID information in the NAF, the NAF will send to the BSF a TID inquiring message containing the identity of the NAF. If the BSF finds the TID inquired by the NAF, it will return to the NAF a response message of success containing the TID found and the term of validity for the TID, the NAF first stores the contents in the response message from the BSF and then makes normal communications with the UE. If the BSF fails to find the TID required by the NAF, it will return to the NAF a response message of failure, and the NAF will instruct the UE to perform a bootstrapping authentication in the BSF.

According to another aspect of the present invention, when an NAF receive an application request message containing a transaction identifier (TID), it determines whether the TID information exists locally, if exists, determines whether the TID expires. If the TID expires, the NAF will make normal communications with the UE; otherwise, the NAF will instruct the UE to perform a bootstrapping authentication in a BSF again.

It can be seen from the above-mentioned scheme that, the present invention takes full advantage of the TID being a bridge of establishing confidence relationship between the NAF and the UE, through a BSF assigning a term of validity for a TID, extends the functions of the TID and enables an NAF to verify the term of validity of the TID used by the UE, thereby implements a further verification of the validity to the UE. By the method of the present invention, it is possible to avoid the situation where a TID is permanently valid for an NAF, improve the system security, lower the possibility of a UE's TID and the corresponding secret key thereof being stolen, and implement the management of TIDs by an NAF. In addition, a combination of the method with the billing system will make it easy to implement the charging of a user.

DETAILED DESCRIPTION OF THE INVENTION

In order to make the technical solution of the present invention clearer, a further and detailed description of the present invention is hereinafter given with reference to the accompanying drawings and specific embodiments.

According to an aspect of the present invention, when an NAF receives an application request message containing the information of a TID, it determines whether the information of the TID exists locally, if exists, determines whether the UE is legitimate by determining whether a preset term of validity for the TID used by the UE is overrun. If the UE is legitimate, the NAF will make normal communications with the UE; otherwise, the NAF will instruct the UE to perform a bootstrapping authentication in a BSF again;

If there is no information of the TID in the NAF, the NAF will send to the BSF a TID inquiring message containing the identity of the NAF. If the BSF finds the TID inquired by the NAF, it will return to the NAF a response message of success containing the TID found and the term of validity for the TID, the NAF first stores the contents in the response message from the BSF and then makes normal communications with the UE. If the BSF fails to find the TID required by the NAF, it will return to the NAF a response message of failure, and the NAF will instruct the UE to perform a bootstrapping authentication in the BSF.

The invention is hereinafter described in detail by several specific embodiments.

First Embodiment

A BSF assigns a UE a TID which is valid for one or more NAFs while not enciphering the TID.

Figure 1:
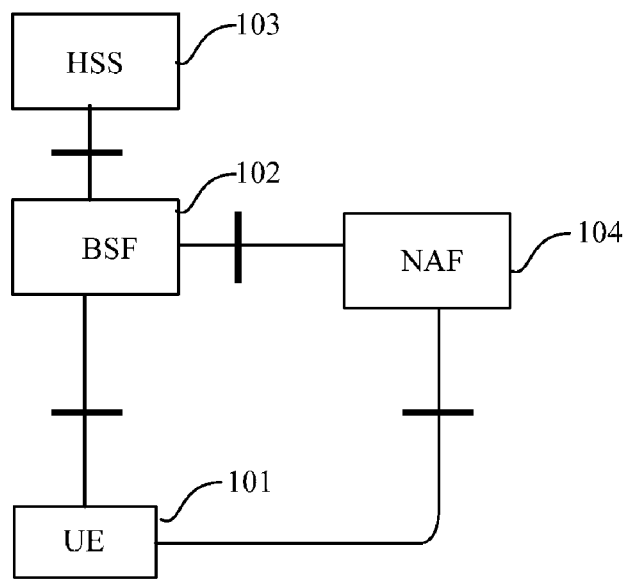
FIG. 1 is a schematic structure diagram illustrating the generic authentication architecture.
Figure 2:
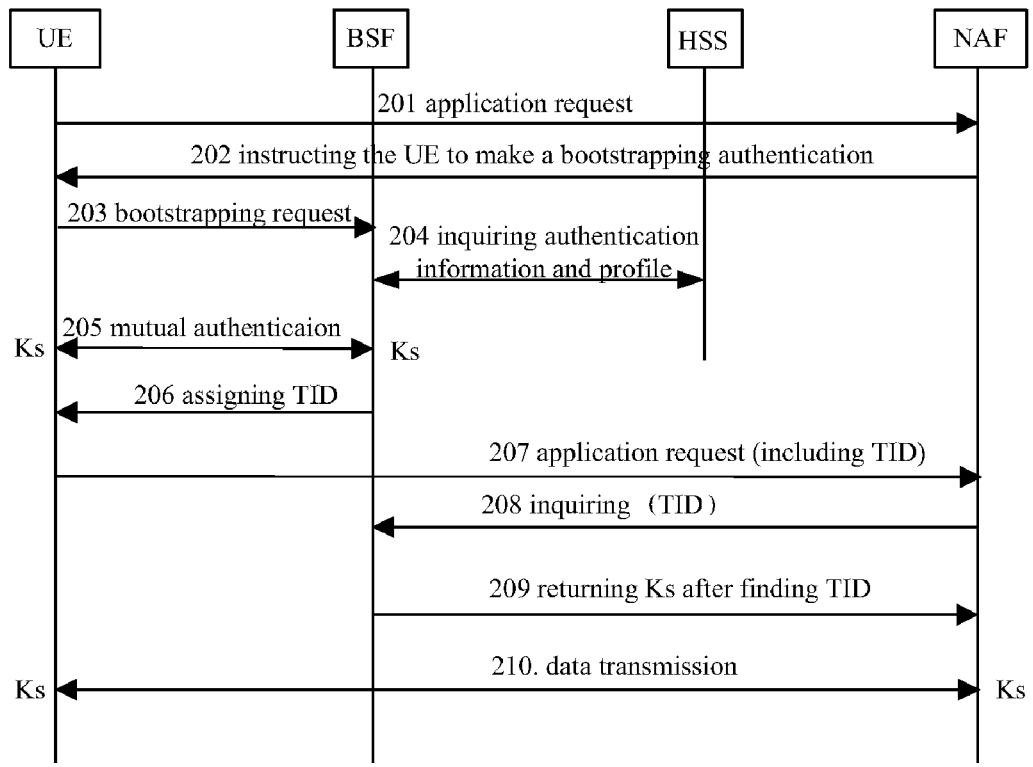
FIG. 2 is a flowchart of a UE authentication using the generic authentication architecture in the prior art.
Figure 3:
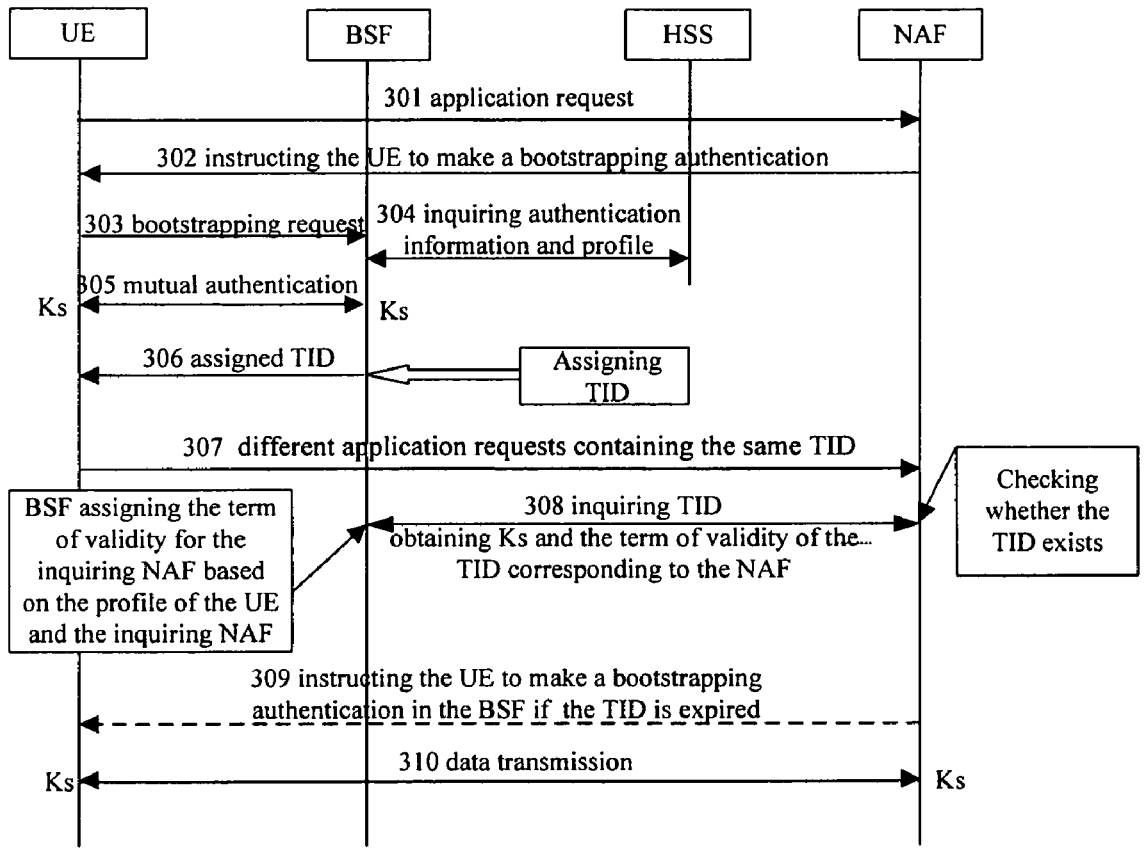
FIG. 3 is a flowchart of verifying the validity of a UE in accordance with an embodiment of the present invention.

FIG. 3 is a flowchart for verifying the validity of a UE in accordance with the first embodiment of the present invention.

Step 301: A UE sends an application request message to an NAF.

Step 302: Upon receiving the message, the NAF finds that the UE has not performed a mutual authentication with a BSF, and then instructs the UE to perform a bootstrapping authentication in the BSF.

Step 303: The UE sends to the BSF a bootstrapping request message.

Step 304: Upon receiving the bootstrapping request message from the UE, the BSF conducts inquiry of the authentication information and profile of the UE to an HSS, and receives a response message from the HSS.

Step 305: Upon receiving the response message containing the information found sent from the HSS, the BSF performs an AKA protocol based mutual authentication with the UE using the information found. When completing the AKA protocol based mutual authentication with the UE, i.e. passing the mutual authentication, the BSF generates a secret key shared with the UE (Ks).

Step 306: the BSF assigns the UE a TID containing only an identity and valid for one or more NAFs at the same time.

Step 307: Upon receiving the TID assigned by the BSF, the UE resends to the NAF an application request message containing the information of the TID.

Step 308: Upon receiving the application request message containing the information of the TID sent from the UE, the NAF determines whether the information of the TID exists locally, if exists, the NAF determines whether the valid lifetime or the valid times of use for the TID is overrun, if overrun, proceeds to Step 309; otherwise, proceeds to Step 310.

If there is no information of the TID in the NAF, the NAF will send to the BSF a TID inquiring message containing the identity of the NAF, if the BSF finds the TID, the BSF will first generate a derived secret key valid for the inquiring NAF based on the user identity, the NAF identity and the root secret key corresponding to the TID, and then assign, according to the security level of the inquiring NAF and the profile information of the UE, a term of validity for the derived secret key generated for the inquired TID, where the term of validity is a valid lifetime and/or valid times of use and is valid only for the inquiring NAF. The BSF, thereafter, sends a response message of success to the NAF, and the NAF stores the contents of the response message of success and proceeds to Step 310. If the BSF fails to find the TID, the BSF will send to the NAF a response message of failure and proceed to Step 309.

The above mentioned response message of success includes the TID inquired by the NAF, the derived secret key corresponding to the TID and generated for the inquiring NAF as well as the term of validity of the derived secret key.

The derived secret key for the inquiring NAF has been generated when the UE sends the application request to the NAF using the TID assigned by the BSF. When the NAF receives the response message of success from the BSF, the NAF starts to share the derived secret key generated for the inquiring NAF with the UE.

Step 309: the NAF instructs the UE to perform a bootstrapping authentication in the BSF, and ends this procedure.

Step 310: the NAF makes normal communications with the UE, i.e. data transmission, and protects further communications using the secret key derived from the Ks.

Though the TID used by a UE is valid for one or more NAFs at the same time, the derived secret keys for different NAFs as well as the terms of validity thereof assigned by the BSF are different, i.e. the same TID, when used for different NAFs, corresponds to different derived secret keys and different terms of validity thereof. In terms of one NAF, however, the TID of the UE and the corresponding derived secret key thereof is unique.

When the TID used by the UE and the corresponding secret key for a certain NAF expires, the UE will perform a bootstrapping authentication in the BSF again. After the authentication succeeds, the BSF will assign the UE a new TID and generate a new shared secret key (Ks') corresponding to the new TID. Upon receiving the new TID, the UE will send a new application request message using the new TID while the new request message also contains the information of the old TID. Thus the NAF using the old TID and the derived secret key thereof will not be affected, and a new TID will not be used unless the UE sends an application request again or the NAF requires that the UE update the TID, thereby avoiding the impact by the NAF requesting to update the TID on other NAFs currently using the TID.

When an NAF receives a new TID, the NAF will always conduct inquiry of the TID in the BSF, if the inquiry succeeds, the BSF will return to the NAF a response message of success which also includes the TID inquired by the NAF, the secret key derived for the TID based on such parameters as the identity of the inquiring NAF and the root secret key, and the term of validity corresponding to the derived secret key. Upon receiving the response message of success from the BSF, the NAF will store the new TID in the response message of success, the derived secret key corresponding to the TID and the term of validity thereof. At the same time, the NAF will disable or delete the old TID stored in it and the secret key corresponding to the old TID.

Since the old TID used by a UE corresponds to multiple NAFs at the same time, when the TID expires for a certain NAF, it is quite possible that the TID is still valid for other NAFs. Since each NAF receiving a new TID will conduct inquiry in the BSF, for the sake of system security, each NAF receiving a new TID will replace the old TID and the related information thereof with the new TID of the UE and the related information thereof. In this way, not only TID management becomes less complex, but the security of TID and the corresponding secret keys is enhanced.

In Step 306 of this embodiment, the BSF may assign the UE a TID only valid for a certain NAF and including only an identity. Accordingly, in Step 308, upon receiving an application request message containing the information of the TID from the UE, the NAF first determines whether the TID is valid for the NAF, if invalid, the NAF will prompt the UE with an error message, if valid, continues with the subsequent steps. The rest steps of the procedure are the same as those shown in FIG. 3 and no further description is hereby given.

The method for assigning a UE a TID only valid for a certain NAF and the method for determining whether the TID is valid for the NAF have been described in detail in the patent application submitted by this inventor and titled as "method for assigning bootstrapping transaction identities" with the application number "200310113233.4", and no further description is hereby given.

In this embodiment, the term of validity of the secret key corresponding to a TID is actually the term of validity of the TID, for the TID is associated with the secret key corresponding to the TID. If a secret key corresponding to a TID expires, it means that the term of validity of the TID for an NAF expires.

Second Embodiment

A BSF assigns a UE a TID valid for only a certain NAF, and the TID is enciphered.

Figure 4:
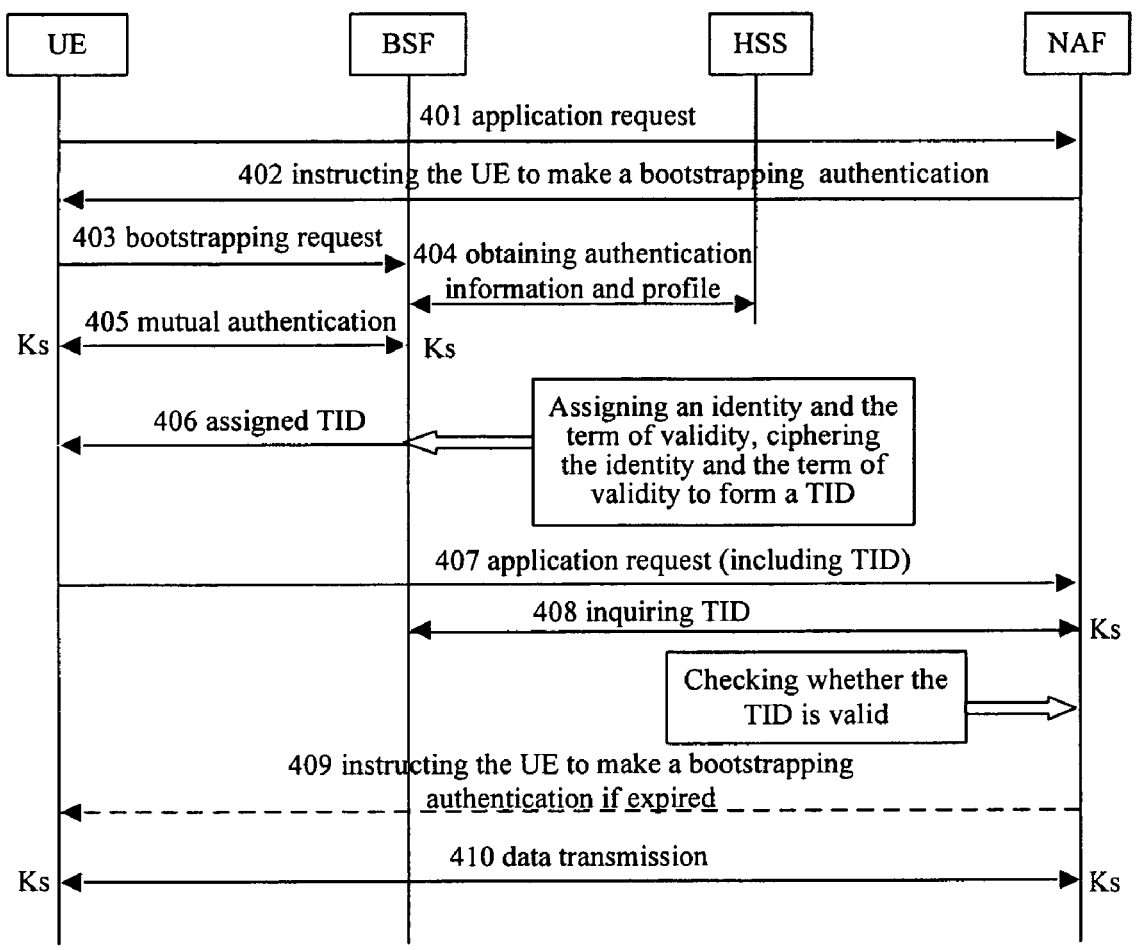
FIG. 4 is a flowchart of verifying the validity of a UE in accordance with another embodiment of the present invention.

FIG. 4 is a flowchart for verifying the validity of a UE in accordance with the second embodiment of the present invention.

Step 401: A UE sends an application request message to an NAF.

Step 402: Upon receiving the message, the NAF finds that the UE has not performed a mutual authentication with the BSF, thus instructs the UE to perform a bootstrapping authentication in the BSF.

Step 403: The UE sends to the BSF a bootstrapping request message.

Step 404: Upon receiving the bootstrapping request message from the UE, the BSF conducts inquiry of the authentication information and profile of the UE to an HSS, and receives a response message from the HSS.

Step 405: Upon receiving the response message containing the information found sent from the HSS, the BSF performs an AKA protocol based mutual authentication with the UE using the information found. When completing the AKA based mutual authentication with the UE, i.e. passing the mutual authentication, the BSF generates a secret key with the UE (Ks).

Step 406: the BSF assigns the UE an identity valid only for a certain NAF, and then, based on the identity or name of the NAF and the profile information of the UE, assigns a term of validity for the identity of the UE, where the term of validity is a valid lifetime and/or valid times of use. The BSF then enciphers the identity valid for the NAF and the term of validity of the identity using the preset secret key shared between the BSF and the NAF (Knb), takes the enciphered information as a TID and sends the TID to the UE. Since the UE does not have Knb the UE is unable to modify the term of validity of the TID.

Step 407: Upon receiving the TID assigned by the BSF, the UE sends to the NAF an application request message containing the enciphered TID.

Step 408: Upon receiving the application request message containing the information of the TID sent from the UE, the NAF first determines whether the information of the TID exists locally, if exists, the NAF deciphers the TID using Knb and determines whether the valid lifetime or valid times of use is overrun, if overrun, proceeds to Step 409; otherwise, proceeds to Step 410.

If there is no information of the TID in the NAF, the NAF will first decipher the TID using Knb and then determine whether the TID is valid for the NAF, where the specific method for performing the determination has been described in detail in the patent application submitted by this inventor and titled as "method for assigning bootstrapping transaction identities" with the application number "200310114069.9". If the TID is valid for the NAF, the NAF will send to the BSF a TID inquiring message containing the identity of the NAF; otherwise, the NAF will prompt the UE with an error message.

If the BSF finds the information of the TID, it will send to the NAF a response message of success containing the TID inquired by the NAF and Ks, the secret key shared between the UE and the BSF and corresponding to the TID or a derived secret key generated from Ks, i.e. the derived secret key generated for the inquiring NAF. Upon receiving the response message of success from the BSF, the NAF starts to share with the UE the derived secret key generated for the inquiring NAF. The derived secret key corresponding to the inquiring NAF has been generated by the UE when the UE sent the application request to the NAF using the TID assigned by the BSF. After the NAF stores the contents in the response message of success from the BSF, proceeds to Step 410. If the BSF fails to find the information, it will send a response message of failure to the NAF and proceeds to Step 409.

Step 409: the NAF instructs the UE to perform a bootstrapping authentication in the BSF, and ends the procedure.

Step 410: the NAF makes normal communications with the UE, i.e. data transmission, and protects the further communications using the Ks or the derived secret key from Ks.

When the TID used by the UE has expired for a certain NAF, the UE will perform mutual authentication in the BSF again. After the authentication succeeds, the BSF will assign the UE a new TID and generate a new shared secret key, Ks', corresponding to the new TID, where the new TID is also enciphered. When the UE sends an application request to the NAF again, the request message contains the information of both the new TID and the old TID.

When an NAF receives a new TID, the NAF will always conduct inquiry of the TID in the BSF. If the inquiry succeeds, the BSF will return to the NAF a response message of success which also contains the TID inquired by the NAF, and Ks' or the derived secret key generated from Ks'. Upon receiving the response message of success from the BSF, the NAF starts to share Ks' or the derived secret key from Ks' with the UE. The NAF will store the new TID and the Ks', and disable or delete the locally-stored old TID and the Ks.

Third Embodiment

The BSF assigns a UE a TID valid only for a certain NAF, and does not encipher the TID.

Figure 5:
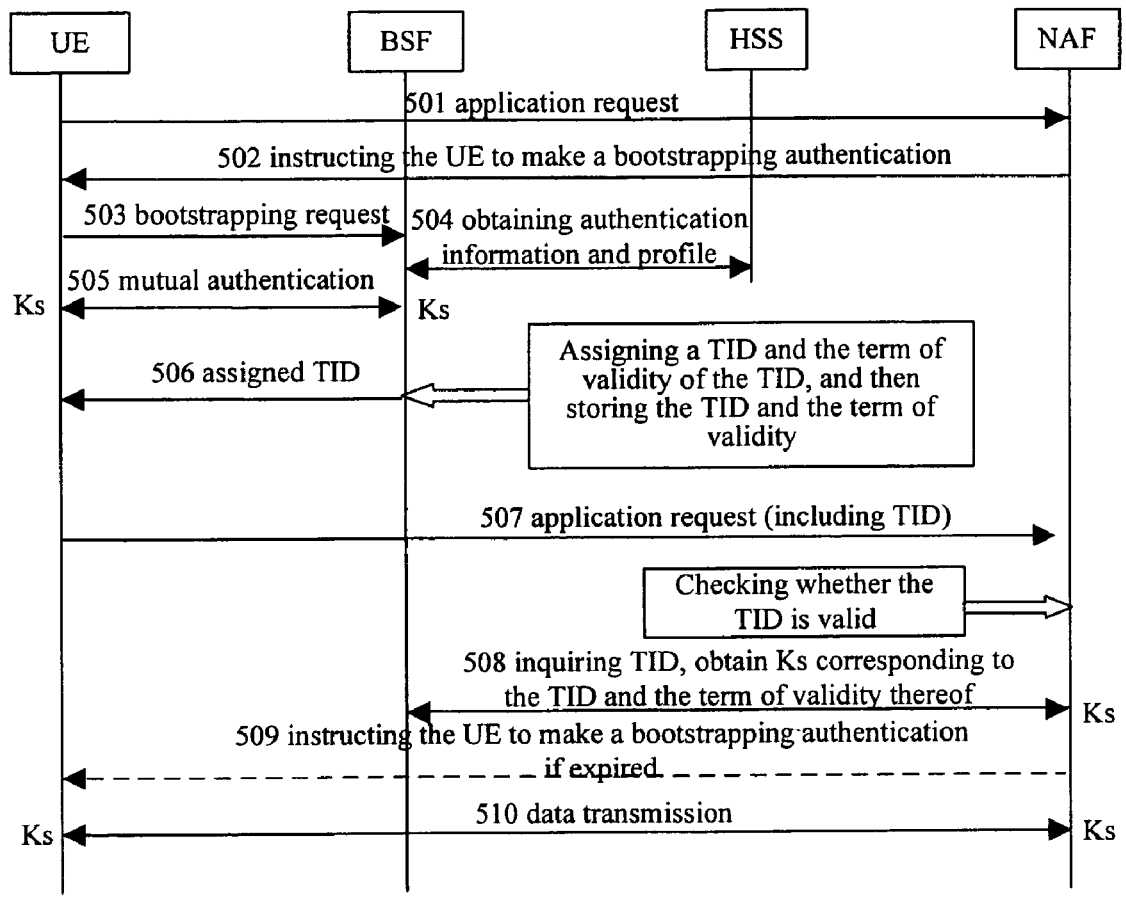
FIG. 5 is a flowchart of verifying the validity of a UE in accordance with yet another embodiment of the present invention.

FIG. 5 is a flowchart for verifying the validity of a UE in accordance with the third embodiment of the present invention.

Step 501: A UE sends an application request message to an NAF.

Step 502: Upon receiving the message, the NAF finds that the UE has not performed a mutual authentication with the BSF, thus instructs the UE to perform a bootstrapping authentication in the BSF.

Step 503: The UE sends to the BSF a bootstrapping request message.

Step 504: Upon receiving the bootstrapping request message from the UE, the BSF conducts inquiry of the authentication information and profile of the UE to an HSS, and receives a response message from the HSS.

Step 505: Upon receiving the response message containing the information found sent from HSS, the BSF performs an AKA protocol based mutual authentication with the UE using the information found. When completing the AKA based mutual authentication with the UE, i.e. passing the mutual authentication, the BSF generates a secret key shared with the UE (Ks).

Step 506: the BSF assigns the UE an identity valid only for a certain NAF, and takes the identity as a TID. Then, based on the identity or name of the NAF and the profile information of the UE, the BSF assigns and stores a term of validity for the TID of the UE, where the term of validity is a valid lifetime and/or valid times of use, and sends the assigned TID to the UE.

Step 507: Upon receiving the TID assigned by the BSF, the UE sends to the NAF an application request message containing the information of the TID again.

Step 508: Upon receiving the application request message containing the information of the TID sent from the UE, the NAF first determines whether the TID is valid for the NAF, if invalid, the NAF will prompt the UE with an error message; if valid, the NAF will further determine whether the information of the TID exists locally. If the information of the TID exists, the NAF determines whether the valid lifetime or valid times of use is overrun, if overrun, proceeds to Step 509; otherwise, proceeds to Step 510.

If there is no information of the TID in the NAF, the NAF will send to the BSF a TID inquiring message containing the identity of the local NAF. If the BSF finds the TID, it will send to the NAF a response message of success containing the TID inquired by the NAF, the term of validity corresponding to the TID, and Ks, the secret key for the TID shared between the UE and the BSF or the derived secret key generated from Ks, i.e. the derived secret key generated for the inquiring NAF. Upon receiving the response message of success from the BSF, the NAF starts to share with the UE the derived secret key generated according to the inquiring NAF, which has been generated by the UE when the UE sent the application request to the NAF using the TID assigned by the BSF. After the NAF stores the contents in the response message of success from the BSF, proceeds to Step 510. If the BSF fails to find the information, it will send a response message of failure to the NAF, informs the NAF that there is no information of the UE, and proceeds to Step 509.

Step 509: the NAF instructs the UE to perform a bootstrapping authentication in the BSF, and ends this procedure.

Step 510: the NAF makes normal communications with the UE, i.e. data transmission, and protects further communications using the Ks or the derived secret key from Ks.

When the TID used by a UE has expired for a certain NAF, the UE will perform a bootstrapping authentication in the BSF again. After the authentication succeeds, the BSF will assign the UE a new TID and generate a new shared secret key, Ks', corresponding to the new TID. When the UE sends an application request again to the NAF, the request message will contain the information of both the new TID and the old TID.

When an NAF receives a new TID, the NAF will conduct inquiry of the new TID in the BSF. If the inquiry succeeds, the BSF will return to the NAF a response message of success which also contains the TID inquired by the NAF, the term of validity corresponding to the TID, and Ks' or the derived secret key generated from Ks'. Upon receiving the response message of success from the BSF, the NAF starts to share Ks' or the derived secret key from Ks' with the UE. The NAF will store the new TID and the secret key associated with the TID, and disable or delete the locally-stored old TID and the secret key associated with the old TID.

In the third embodiment, when assigning a TID for a UE, the BSF may not assign the term of validity corresponding to the TID at first. Instead, the BSF may assign a term of validity corresponding to the TID according to the identity of the NAF and the profile information of the UE when the NAF conducts inquiry of the TID in the BSF.

The term of validity of the TID may be used in billing. If the billing is based on time, a TID may be taken as a time unit, and charging for one day's use may be made whenever a new TID is assigned. If the billing is based on times of use, a TID may be charged according to the times of use it is assigned. The billing operation may be implemented when a BSF assigns a TID, or implemented when an NAF uses a TID.

The foregoing is only preferred embodiments of the present invention and is not inclined to limit the present invention. Any modification, equivalent substitution, or improvement made without departing from the spirit and principle of the present invention should be covered by the scope set forth in the appended claims.

The invention claimed is:

1. A method for a network application function unit (NAF) of a third generation wireless communication network to verify validity of a user, comprising:
   receiving an application request message containing a transaction identifier (TID) from a user equipment device (UE) of the user,
   checking whether there is information of the TID stored in the NAF;
      if the information of the TID is found, determining whether the TID has expired based on a preset term of validity for the TID,
         if the TID has not expired, making normal communications with the UE;
         if the TID has expired, instructing the UE to connect to a bootstrapping server function unit (BSF) for performing a bootstrapping authentication; wherein the term of validity for the TID is assigned by the BSF; and
      if the information of the TID is not found, sending to the BSF a TID inquiring message containing an identity of the NAF,
   wherein
      if the BSF finds the TID inquired by the NAF, the BSF returns to the NAF a response message of success containing the information of the TID and the term of validity of the TID, and the method further comprises:
         storing the information of the TID and the term of validity of the TID in the response message and making normal communications with the UE;
      or
      if the BSF fails to find the TID inquired by the NAF, the BSF returns to the NAF a response message of failure, and the method further comprises:
         instructing the UE to perform a bootstrapping authentication with the BSF.

2. The method according to claim 1, wherein the NAF receiving the application request message from the UE comprises:
   receiving the application request message sent by the UE after the UE receives the TID assigned by the BSF;
   wherein the TID is assigned by the BSF after the BSF passes a mutual authentication between the UE and the BSF, and the TID includes only a TID identity, which is valid for one or more NAFs at the same time and associated with a secret key (Ks) to be shared between the UE and the BSF, wherein the Ks is generated by the BSF during the mutual authentication between the UE and the BSF.

3. The method according to claim 2, wherein the method further comprises:
   the NAF receiving an application request message containing a new TID and an old TID from the UE, wherein the new TID is assigned and sent by the BSF to the UE after the UE succeeds in performing a bootstrapping authentication in the BSF;
   conducting inquiry in the BSF;
   receiving a response message of success from the BSF, wherein the response message of success carries the new TID of the UE and a secret key associated with the new TID, and the secret key associated with the new TID is assigned by the BSF;
   storing the new TID of the UE and the secret key associated with the new TID; and
   deleting or disabling the old TID previously stored in the NAF and the secret key associated with the old TID.

4. The method according to claim 2, wherein said term of validity is determined by the BSF based on a security level of the inquiring NAF and profile information of the UE.

5. The method according to claim 1, wherein the NAF receiving the application request message from the UE comprises:
   receiving the application request message sent by the UE after the UE receives the TID assigned by the BSF,
   wherein the TID is assigned by the BSF after the BSF passes a mutual authentication between the UE and the BSF, and the TID includes only a TID identity, which is valid only for the NAF and associated with a secret key (Ks) to be shared between the UE and the BSF, the Ks is generated by the BSF during the mutual authentication between the UE and the BSF;
   and the method further comprises, before the NAF checks whether there is information of the TID stored in the NAF:
   determining whether the TID is valid for the NAF or not,
      if valid, the NAF performing the checking whether there is the information of TID stored in the NAF;
      if not valid, the NAF prompting the UE with an error message.

6. The method according to claim 5, wherein the method further comprises:
   the NAF receiving an application request message containing a new TID and an old TID from the UE, wherein the new TID is assigned and sent by the BSF to the UE after the UE succeeds in performing a bootstrapping authentication in the BSF;
   conducting inquiry in the BSF;
   receiving a response message of success from the BSF, wherein the response message of success carries the new TID of the UE and a secret key associated with the new TID, and the secret key associated with the new TID is assigned by the BSF;
   storing the new TID of the UE and the secret key associated with the new TID; and
   deleting or disabling the old TID previously stored in the NAF and the secret key associated with the old TID.

7. The method according to claim 5, wherein said term of validity is determined by the BSF based on a security level of the inquiring NAF and profile information of the UE.

8. The method according to claim 1, wherein the NAF receiving the application request message comprises:
   receiving the application request message sent by the UE after the UE receives the TID assigned by the BSF;
   wherein the TID, which is associated with a secret key (Ks) to be shared between the UE and the BSF, includes an enciphered identity, the Ks is generated by the BSF during a mutual authentication between the UE and the BSF, and the enciphered identity is enciphered by the BSF from an assigned identity valid only for the NAF as well as the term of validity for using the identity by using a set secret key (Knb) to be shared between the BSF and the NAF;

the method further comprising, before the NAF determines whether the TID has expired or not:

the NAF deciphering the received TID by using the Knb;

or the method further comprises, before the NAF sends to the BSF the TID inquiring message:

the NAF deciphering the received TED by using the Knb, and determining whether the TID is valid for the NAF,
if valid, the NAF performing the sending to the BSF the TED inquiring message;
if not valid, the NAF prompting the UE with an error message;

wherein the response message of success returned by the BSF further comprises: the Ks associated with the TID inquired by the NAF.

9. The method according to claim 8, wherein the method further comprises:

the NAF receiving an application request message containing a new TID and an old TID from the UE, wherein the new TID is assigned and sent by the BSF to the UE after the UE succeeds in performing a bootstrapping authentication in the BSF;

conducting inquiry in the BSF;

receiving a response message of success from the BSF, wherein the response message of success carries the new TID of the UE and a secret key associated with the new TID, and the secret key associated with the new TID is assigned by the BSF;

storing the new TID of the UE and the secret key associated with the new TID; and deleting or disabling the old TID previously stored in the NAF and the secret key associated with the old TID.

10. The method according to claim 8, wherein said term of validity is determined by the BSF based on the identity or name of the NAF and on profile information of the UE.

11. The method according to claim 1, wherein before the NAF checks whether there is the information of the TID stored in the NAF:

a secret key (Ks) to be shared between the UE and the BSF is generated by the BSF from a mutual authentication between the UE and the BSF, the TID assigned to the UE by the BSF includes only a TID identity valid for the NAF and is associated with the secret key Ks, the TID and a term of validity for the TID assigned by the BSF is stored by the BSF, and the TID is sent to the UE by the BSF;

and the method further comprises:

the NAF determining whether the TID is valid for the NAF,
if valid, the NAF performing the checking whether there is the information of the TID stored in the NAF;
if not valid, the NAF prompting the UE with an error message;

wherein the response message of success returned by the BSF further comprises the Ks associated with the TID inquired by the NAF.

12. The method according to claim 11, wherein the method further comprises:

the NAF receiving an application request message containing a new TID and an old TID from the UE, wherein the new TID is assigned and sent by the BSF to the UE after the UE succeeds in performing a bootstrapping authentication in the BSF;

conducting inquiry in the BSF;

receiving a response message of success from the BSF, wherein the response message of success carries the new TID of the UE and a secret key associated with the new TID, and the secret key associated with the new TID is assigned by the BSF;

storing the new TID of the UE and the secret key associated with the new TID; and deleting or disabling the old TID previously stored in the NAF and the secret key associated with the old TID.

13. The method according to claim 11, wherein said term of validity is determined by the BSF based on the identity or name of the NAF and on profile information of the UE.

14. The method according to claim 1, wherein the method further comprise:

the NAF receiving an application request message containing a new TID and an old TID from the UE, wherein the new TID is assigned and sent by the BSF to the UE after the UE succeeds in performing a bootstrapping authentication in the BSF;

conducting inquiry in the BSF;

receiving a response message of success from the BSF, wherein the response message of success carries the new TID of the UE and a secret key associated with the new TID, and the secret key associated with the new TID is assigned by the BSF;

storing the new TID of the UE and the secret key associated with the new TID; and deleting or disabling the old TID previously stored in the NAF and the secret key associated with the old TID.

15. The method according to claim 14, wherein said secret key associated with the TID is a derived secret key which is derived, in connection with the inquiring NAF, from a root secret key associated with the TID.

16. The method according to claim 1, further comprising: the NAF or the BSF performing billing operations according to the term of validity of the TID.

17. The method according to claim 1, wherein said term of validity is a lifetime or valid times of use.

18. A method for a network application function (NAF) unit of a third generation wireless communications network to verify validity of a user, comprising:

receiving an application request message containing a transaction identifier (TID) from a user equipment device (UE) of the user, checking whether there is information of the TID stored in the NAF;
if the information of the TID is found, determining whether the TID has expired based on a preset term of validity for the TID;
if the TID has not expired, making normal communications with the UE;
if the TID has expired, instructing the UE to connect to a bootstrapping server function unit (BSF) for performing a bootstrapping authentication, wherein the term of validity for the TID is assigned by the BSF.

19. The method according to claim 18, wherein the NAF receiving the application request message from the UE comprises:

receiving the application request message sent by the UE after the UE receives the TID assigned by the BSF, wherein the TID is assigned by the BSF after the BSF passes a mutual authentication between the UE and the BSF, and the TID includes only a TID identity, which is valid for one or more NAFs at the same time and associated with a secret key (Ks) to be shared between the UE and the BSF, wherein the Ks is generated by the BSF during the mutual authentication between the UE and the BSF.

20. The method according to claim 18, wherein the NAF receiving the application request message from the UE comprises:
   receiving the application request message sent by the UE after the UE receives the TID assigned by the BSF,
   wherein the TID is assigned by the BSF after the BSF passes a mutual authentication between the UE and the BSF, and the TID includes only a TID identity, which is valid only for the NAF and associated with a secret key (Ks) to be shared between the UE and the BSF, the Ks is generated by the BSF during the mutual authentication between the UE and the BSF;
   and the method further comprises, before the NAF checks whether there is information of the TID stored in the NAF:
   the NAF determining whether the TID is valid for the NAF or not,
      if valid, the NAF performing the checking whether there is the information of the TID stored in the NAF;
      if not valid, the NAF prompting the UE with an error message.

21. The method according to claim 18, wherein the NAF receiving the application request message comprises:
   receiving the application request message sent by the UE after the UE receives the TID assigned by the BSF;
   wherein the TID associated with a secret key (Ks) to be shared between the UE and the BSF includes an enciphered identity, the Ks is generated by the BSF during a mutual authentication between the UE and the BSF, and the enciphered identity is enciphered by the BSF from an assigned identity valid only for the NAF as well as the term of validity for using the identity by using a set secret key (Knb) to be shared between the BSF and the NAF;
   and the method further comprises: before the NAF determines whether the TID has expired or not:
   the NAF deciphering the received TID by using the Knb.

22. The method according to claim 18, wherein before the NAF checks whether there is the information of the TID stored in the NAF:
   a secret key (Ks) to be shared between the UE and the BSF is generated by the BSF from a mutual authentication between the UE and the BSF; the TID assigned to the UE by the BSF includes only a TID identity valid for the NAF and is associated with the Ks, the TID and a term of validity for the TID assigned by the BSF is stored by the BSF;
   and the method further comprises:
   the NAF determining whether the TID is valid for the NAF,
      if valid, the NAF performing the checking whether there is the information of the TID stored in the NAF;
      if not valid, the NAF prompting the UE with an error message.

23. A network application function (NAF) unit in a third generation wireless communication network, comprising:
   a signal receiving unit, configured to receive an application request message containing a transaction identifier (TID) from a user equipment device (UE) of a user,
   a checking unit, configured to check whether there is information of the TID stored in the NAF; and
   a processing unit, configured to determine whether the TID has expired based on a preset term of validity for the TID when the checking unit finds the information of the TID;
   if the TID has not expired, make normal communications with the UE; and if the TID has expired, instruct the UE to connect to a bootstrapping server function unit (BSF) for performing a bootstrapping authentication; wherein the term of validity for the TID is assigned by the BSF.

24. The NAF according to claim 23, wherein,
   the signal receiving unit is configured to receive the service application request message containing the TID sent by the UE after the UE receives the TID assigned by the BSF, wherein the TID is assigned by the BSF after the BSF passes a mutual authentication between the UE and the BSF, and includes only a TID identity which is valid for one or more NAFs at the same time and associated with a secret key (Ks) to be shared between the UE and the BSF, wherein the Ks is generated by the BSF during the mutual authentication between the UE and the BSF.

25. The NAF according to claim 23, wherein,
   the signal receiving unit is configured to receive the application request message containing the TID from the UE, the TID is assigned by the BSF after the BSF passes a mutual authentication between the UE and the BSF, and the TID includes only a TID identity which is valid only for the NAF and associated with a secret key (Ks) to be shared between the UE and the BSF, the Ks is generated by the BSF during a mutual authentication between the UE and the BSF;
   and the NAF further comprises a determining unit, configured to determine whether the TID is valid for the NAF or not after the signal receiving unit receives the application request message, if valid, perform the checking unit to check whether there is the information of the TID stored in the NAF; otherwise, prompt the UE with an error message.

26. The NAF according to claim 23, wherein,
   the signal receiving unit is configured to receive the service application request message containing the TID sent by the UE after the UE receives the TID assigned by the BSF, wherein the TID associated with a secret key (Ks) to be shared between the UE and the BSF includes an enciphered identity, the enciphered identity is enciphered by the BSF from an assigned identity valid only for the NAF as well as the term of validity for using the identity by using a set secret key (Knb) shared between the BSF and the NAF, the Ks is generated by the BSF during a mutual authentication between the UE and the BSF; and
   the processing unit is further configured to decipher the received TID by using the Knb.

27. The NAF according to claim 23, wherein,
   the signal receiving unit is configured to receive the service application request message containing the TID sent by the UE after the UE receives the TID assigned by the BSF, wherein the TID is assigned to the UE by the BSF, the TID includes only a TID identity which is valid for the NAF and is associated with a secret key (Ks) to be shared between the UE and the BSF, the Ks is generated by the BSF from a mutual authentication between the UE and the BSF, and the TID and a term of validity for the TID assigned by the BSF is stored by the BSF;
   and the NAF further comprises a determining unit, which is configured to determine whether the TID is valid for the NAF after the signal receiving unit receives the application request message, if valid, performing the checking unit to check whether there is the information of the TID stored in the NAF; otherwise, prompting the UE with an error message.

* * * * *